No. 654,452. Patented July 24, 1900.
A. C. HAVEN.
BICYCLE SUPPORT.
(Application filed May 17, 1897.)
(No Model.)
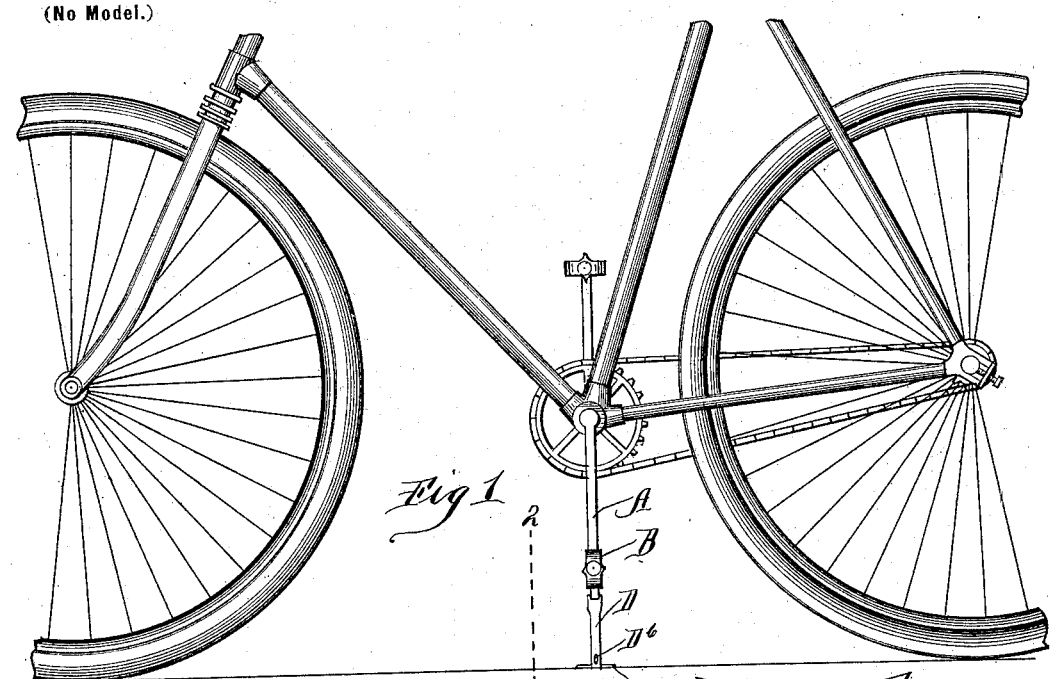
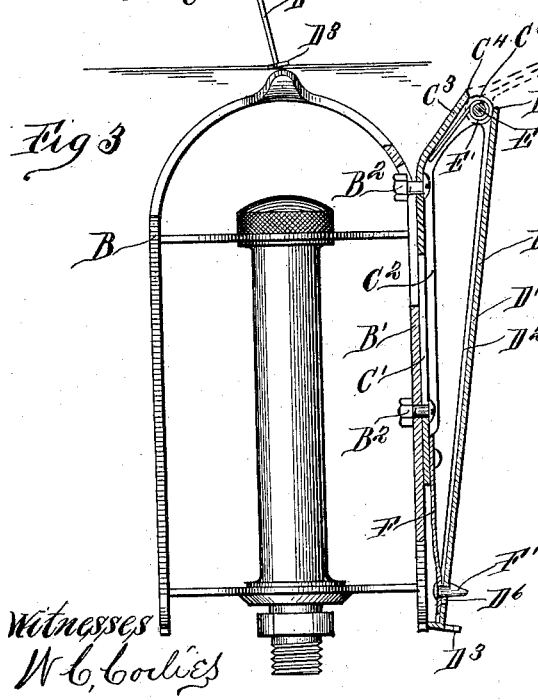
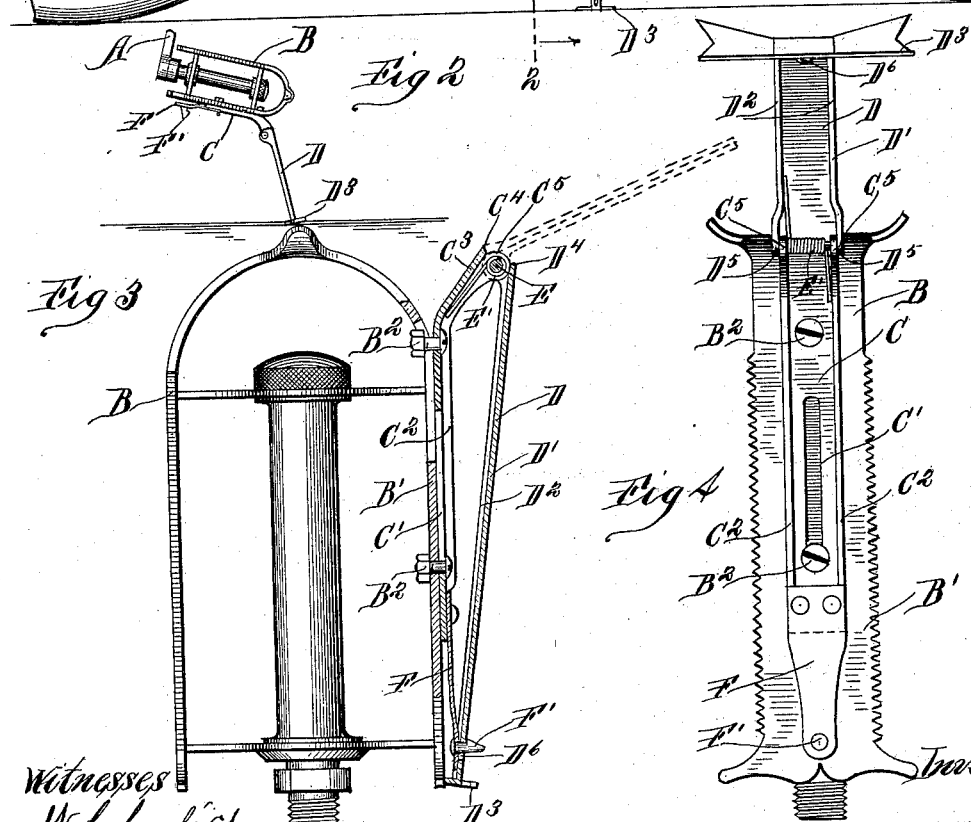
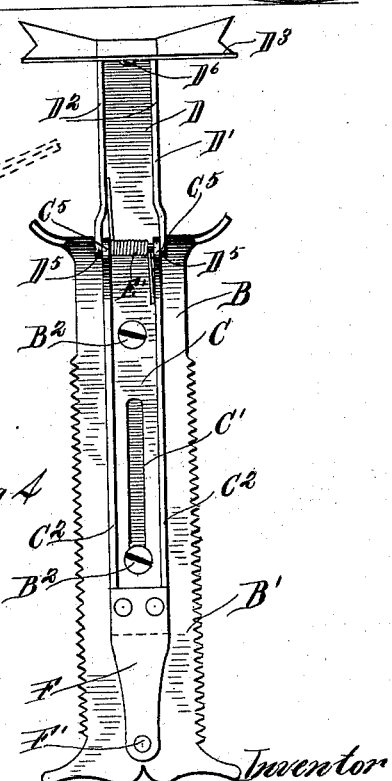
Witnesses
W. C. Coolies
C. H. Crawford
Inventor
Alfred C. Haven
By Coburn & Strong Attys
THE NORRIS PETERS CO., PHOTO-LITHO., WASHINGTON, D. C.

UNITED STATES PATENT OFFICE.

ALFRED C. HAVEN, OF LAKE FOREST, ILLINOIS.

BICYCLE-SUPPORT.

SPECIFICATION forming part of Letters Patent No. 654,452, dated July 24, 1900.

Application filed May 17, 1897. Serial No. 636,904. (No model.)

*To all whom it may concern:*

Be it known that I, ALFRED C. HAVEN, a citizen of the United States, residing at Lake Forest, in the county of Lake and State of Illinois, have invented a certain new and useful Improvement in Bicycle-Supports, which is fully set forth in the following specification, reference being had to the accompanying drawings, in which—

Figure 1 is a side elevation of a portion of a bicycle, showing my improved support in position. Fig. 2 is a front elevation of the pedal and the support attached and in operation as in Fig. 1. Fig. 3 is a plan view of the pedal detached and with the support held out of position for use, a portion of the pedal and support being in section to more clearly illustrate its construction and attachment. Fig. 4 is a plan view of the pedal with the support attached and in position for operation, but looking at it from the under side.

My invention relates to a new and useful support for a bicycle which is attached to a pedal and when not in use is folded against said pedal and held in position so as to be out of the way and firmly secured. It is designed to furnish a simple and light support that can be easily attached to a pedal and readily thrown into position for use when desired.

Referring to the drawings, A represents the pedal-crank, to which the pedal B is secured in the customary manner.

The support consists of the base C, which may be secured upon the outside of one portion of the notched frame B', which is employed to furnish a secure grip for the sole of the shoe upon said pedal. I have shown this base C as containing a slot C' and as having the flanges $C^2$ projecting upwardly therefrom, as clearly shown in Figs. 3 and 4. This base C is secured to the notched frame B' by a pair of screws or bolts $B^2$, and the slot C' in the base C and the slot $B^3$ in the frame or side pedal-bar B' enable this base to be conveniently adjusted to any form or length of frame that may be desired. The flanges $C^2$ serve to strengthen the base and also to protect the heads of the screws or bolts $B^2$. The base-piece C terminates in a portion $C^3$, which is curved outwardly from the main body and terminates in the abrupt shoulder $C^4$, while the flanges $C^2$ are enlarged to form ears $C^5$, to which is pivoted the supporting-piece proper, D. This supporting-piece D may consist of the bar D', having the flanges $D^2$, which resemble the flanges on the base-piece C and which terminate in the ears $D^5$, while the end of the bar D' terminates in the abrupt shoulder $D^4$. These ears $C^5$ and $D^5$ are pivotally connected to each other by the pin E, which is surrounded by the small coiled spring E', whose ends take against the curved portion $C^3$ of the base and against the bar D' of the support, so as to hold said base and said support, with their shoulders $C^4$ and $D^4$, firmly abutting against each other. The end of the bar D' terminates in an extension or foot $D^3$, which may be of the design clearly shown in Fig. 4. The base-piece C may terminate in or have secured thereto a spring-catch, which may consist of the spring-piece F, which carries the hook F', which coöperates with an aperture $D^6$ in said bar D'. From a consideration of this construction it will be seen that the support D is caught by said spring-catch and securely held in the position shown in Fig. 3 until it is intentionally released by the application of pressure to said spring-catch to permit the spring E' to throw it into the position shown in dotted lines in Fig. 3 or in the other figures. When it is in this position, the bicycle can be left securely supported, as shown in Figs. 1 and 2, and when it is desired to remount the wheel all that is necessary is to kick the support under the pedal until it is caught by the spring-catch, when it is out of the way and firmly secured.

I purpose making the support of some strong and light material, such as aluminium, and I find that such a support weighs but a fraction of an ounce and makes a satisfactory and always convenient support for the wheel.

It will be understood that I can make some variations from the exact construction shown and that the base-piece C might be omitted and the support and spring-catch attached directly to the frame. Therefore I do not desire to be limited to the exact construction shown and described, but only to so much as may be necessitated by the state of the art and the terms of the following claims.

I claim—

1. In a bicycle-support, the pedal-crank, the pedal, a plate secured to the side of one of the pedal side bars, and a foldable supporting-arm attached to said plate at one end thereof, and foldable upon said side bar, substantially as described.

2. A bicycle-support comprising in combination with the pedal-crank and the pedal having side bars, a horizontal base-plate secured to one of the side bars, a supporting-arm pivoted at one end to one end of the base-plate and normally foldable thereon and means for detachably fastening the free end of the arm when so folded.

3. A bicycle-support comprising in combination with the pedal-crank and the pedal having side bars, a horizontal base-plate secured to one of the side bars, a supporting-arm pivoted at one end to one end of the base-plate and normally foldable thereon, means for detachably fastening the free end of the arm when so folded and a spring for thrusting the arm into operative position when detached from its said fastening.

4. The combination of a bicycle-pedal having side bars, a base-plate secured to one of said bars and having the ears $C^5$ and the shoulder $C^4$ at one end, a support having the ears $D^5$ and the shoulder $D^4$ coöperating with the ears $C^5$ and the shoulder $C^4$, a pivot-pin E bearing in said ears and by which the support is pivoted to the base-plate, and the spring $E'$ interposed between said base-plate and support and tending to throw said support into operative position.

5. The combination of a bicycle-pedal having side bars, a base-plate separate from the pedal but adjustably secured to one of said side bars, a support pivoted to said base-plate and the catch F F' to engage said support and normally hold it positively in a position substantially parallel to said pedal.

6. The combination of a bicycle-pedal, a base-plate separate from the pedal but secured thereto, said plate having ears $C^5$ and the shoulder $C^4$ at one end, a support having ears $D^5$ and the shoulder $D^4$ at one end and the foot $D^3$ and aperture $D^6$ at the other end, a pin E bearing in said ears and whereby the support is pivoted to the base-plate, the spring $E'$ interposed between said base-plate and said support, and the spring-catch F F', all coöperating substantially as and for the purpose described.

7. In a bicycle-support, the combination of a pedal-crank, a pedal having a pedal pin or shaft and side pieces or foot-plates substantially parallel to said pin, a base-plate adjustable longitudinally upon one of said side pieces, and a supporting-arm pivotally connected to said plate.

8. In a bicycle-support, the combination of a pedal-crank, a pedal thereon, a member separate from but attached to the pedal-frame and parallel to the shaft of the pedal, and a spring-pressed supporting-arm pivotally connected to said member, said member being adjustable longitudinally on the pedal-frame.

9. In a bicycle-support, the combination of a pedal-crank, a pedal thereon having a pedal-shaft and two parallel side bars, a base-plate attached to one of the side bars, and a spring-pressed supporting-arm pivotally connected to said base-plate, said base-plate being adjustable longitudinally on its side bar.

ALFRED C. HAVEN.

Witnesses:
A. A. MURRAY,
F. E. BROM.